United States Patent
Lyson et al.

(12)

(10) Patent No.: US 6,336,121 B1
(45) Date of Patent: *Jan. 1, 2002

(54) METHOD AND APPARATUS FOR SECURING AND ACCESSING DATA ELEMENTS WITHIN A DATABASE

(75) Inventors: Patrick A. Lyson, Nepean; Ron J. Vandergeest, Kanata, both of (CA)

(73) Assignee: Entrust Technologies, Ltd., Ottawa ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,286

(22) Filed: Mar. 24, 1998

(51) Int. Cl.[7] .............................................. G06F 17/30
(52) U.S. Cl. ................................. 707/201; 707/8; 707/9
(58) Field of Search ............................... 707/201, 9, 1, 707/2, 8, 6, 10, 100, 101, 200, 21, 25; 380/21, 25, 4; 713/183

(56) References Cited

U.S. PATENT DOCUMENTS

| | | | | |
|---|---|---|---|---|
| 5,535,276 A | * | 7/1996 | Ganesan ........................ | 380/25 |
| 5,727,156 A | * | 3/1998 | Herr-holyman et al. ..... | 709/219 |
| 5,737,419 A | * | 4/1998 | Ganesan ........................ | 380/21 |
| 5,864,667 A | * | 1/1999 | Barkan ........................ | 713/201 |
| 5,920,630 A | * | 7/1999 | Wertheimer et al. .......... | 380/25 |
| 5,924,094 A | * | 7/1999 | Sutter .......................... | 707/10 |
| 5,991,399 A | * | 11/1999 | Graunke et al. ............... | 380/4 |
| 6,185,685 B1 | * | 2/2001 | Morgan et al. ............. | 713/183 |

* cited by examiner

Primary Examiner—Sanjiv Shah
(74) Attorney, Agent, or Firm—Vedder, Price, Kaufman & Kammholz

(57) ABSTRACT

A method and apparatus for securing and accessing data elements within a database is accomplished by securing a symmetric key based on an encryption public key. This may be done for the entire database or portions thereof. Once a symmetric key is secured, the computing system may receive a data element for storage in a database. When a data element is received, the computing device retrieves the secured symmetric key and then decrypts it based on a decryption private key. Having decrypted the secured symmetric key, the recaptured symmetric key is used to secure the data element. The securing is done utilizing an encryption algorithm and the symmetric key. Once the data element has been secured, it is stored in the database. To retrieve a secured data element from the database, a request for access must be received. Once a request is received, the computing device retrieves a secured data element in response to the request. The secured data element has been secured based on a secured symmetric key wherein the secured symmetric key was secured based on an encryption public key associated with the requesting entity. Having retrieved the secured data element, the secured symmetric key is retrieved and decrypted based on a decryption private key. The recaptured symmetric key is used in conjunction with a decryption algorithm, such as DES, to decrypt the data. The recaptured data is then provided to the requesting entity.

19 Claims, 4 Drawing Sheets

METHOD AND APPARATUS FOR SECURING AND ACCESSING DATA ELEMENTS WITHIN A DATABASE

TECHNICAL FIELD OF THE INVENTION

The present invention relates generally to databases and more particularly to a method and apparatus for securing and accessing data elements within the database.

BACKGROUND OF THE INVENTION

The general structure and use of databases are known. Databases typically allow a large amount of relational data to be stored, modified, updated, and retrieved in an efficient manner. The relationship of data placed into a database may be done as a two-dimensional relationship, i.e., rows and columns, three-dimensional relationship, i.e., rows, columns, and depth, four-dimensional relationships, and beyond. In a two-dimensional database, the columns typically represent data fields, while the rows represent data content. For example, if a company uses a two-dimensional database to store employee information, the data fields may include employee name, employee number, department number, phone, payroll information, security access levels, etc., while the data content of the rows includes the relevant information of a given employee.

To protect data stored within a database, access to the database is limited. The limited access may be achieved by physical limitations, i.e., the database is stored on a computer that is physically not available to unauthorized personnel. The physical isolation of a database may be achieved by having the computer stored in a controlled access environment. Alternatively, the database may be protected by passwords, and/or encrypted using a master symmetric key.

While each of these methods controls access to a database, the security and limited access are not optimal. For example, the master symmetric key technique secures each data element of the database based on a master symmetric key, but the master symmetric key is a clear text key such that if unauthorized personnel obtained it, the unauthorized personnel could access the database. As such, any one having access to the symmetric key can access the database Having the computer that supports the database in a physically isolated environment is inconsistent with today's demands for data availability to a wide group of users. For example, many companies have facilities located throughout the world, wherein each facility requires access to certain pieces of information that may be stored within a database. Thus, if the database were contained in a physically isolated area, the remote sites would have no access to the information except to create their own. Once multiple copies of the same data are created, it is difficult to keep all copies current.

Therefore, a need exists for a method and apparatus that secures a database without the limitations of existing techniques.

DETAILED DESCRIPTION OF A PREFERRED EMBODIMENT

Generally, the present invention provides a method and apparatus for securing and accessing data elements within a database. This may be accomplished by securing a symmetric key based on an encryption public key for the entire database or portions thereof Once a symmetric key is secured, the computing system may receive a data element for storage in a database. When a data element is received, the computing device retrieves the secured symmetric key and then decrypts it based on a decryption private key. The decryption private key uniquely corresponds to the encryption public key that was used to secure the symmetric key. Having decrypted the secured symmetric key, the recaptured symmetric key is used to secure the data element. The securing is done utilizing an encryption algorithm and the symmetric key, where the encryption algorithm, such as DES, is applied to encrypt the data. Once the data element has been secured, it is stored in the database.

To retrieve a secured data element from the database, a request for access must be received. Once a request is received, the computing device retrieves a secured data element in response to the request. The secured data element has been secured based on a secured symmetric key, which is a symmetric key that was secured using an encryption public key associated with the requesting entity. Having retrieved the secured data element, the secured symmetric key is retrieved and decrypted based on a decryption private key associated with the requesting entity. The recaptured symmetric key is used in conjunction with a decryption algorithm, such as DES, to decrypt the data. The recaptured data is then provided to the requesting entity. Note that the same symmetric key may be secured using a plurality of encryption public keys such that a plurality of entities, i.e., those associated with the encryption public keys, may request the securing of data elements. Further note that a plurality of symmetric keys may be secured based on a plurality of encryption public keys. With such a method and apparatus, access to a secured database is controlled via public key pairs without having to establish one wrapped symmetric key per secure data element. For example, there may be fifty secure data elements, each of which is associated with one of two pluralities of wrapped symmetric keys. Thus, securing of data within a database is obtained with the further enhancement of controlling access to the database.

Figure 1:
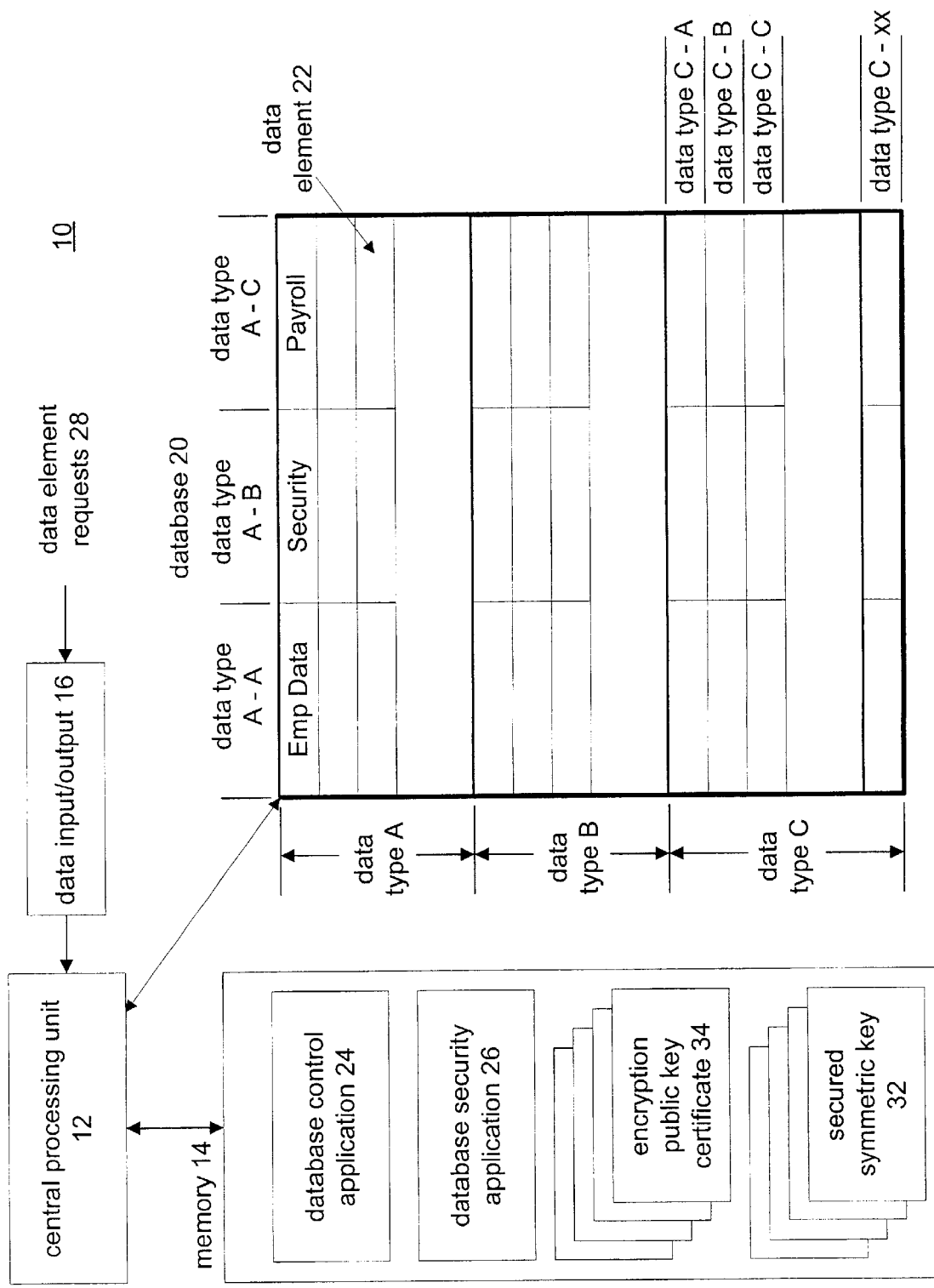
FIG. 1 illustrates a schematic block diagram of a database system in accordance with the present invention.

The present invention can be more fully described with reference to FIGS. 1 through 4. FIG. 1 illustrates a schematic block diagram of a computing device 10 that includes a central processing unit 12, memory 14, a data input/output port 16, and a database 20. The central processing unit 12 includes a microprocessor, microcontroller, digital signal processor, a plurality thereof, and/or a combination thereof The memory 14 may be read-only memory, random access memory, floppy disk memory, hard disk memory, magnetic tape memory, CD ROM memory, DVD ROM memory, and/or any other device that stores digital information. The database 20 is a random access memory, floppy disk memory, hard disk memory, magnetic tape memory, any other device that stores digital information, and/or any combination thereof.

The memory 14 stores a database control application 24, a database security application 26, at least one encryption public key certificate 34, and at least one secured symmetric key 32. The database control application 24 is an application that controls the establishment and maintenance of database 20. For example, the database application 24 may be a Microsoft Access™ database, a Filemaker Pro™ database, or any other commercially available or customized database algorithm. The database security application 26 interfaces with the database control application 24 and performs the programming instructions illustrated in FIGS. 2 through 4, the details of which will be discussed subsequently.

The encryption public key certificate 34 includes an identity of the computing device 10, an encryption public key for computing device 10, and an Electronic signature of a certification authority issuing the certificate 34. By utilizing certificates, the certification authority controls which other entities will have access to the database. As such, the operator of computing device 10 may be the only entity to have access to database 20, or a plurality of entities may have access to the database, where the access is obtained through the Internet, local area network, wide area network, and/or other digital networking scheme. Such entities may be different programming applications, such as a payroll application, encryption application, a human resources application, accounting application, etc. Alternatively, the different entities may be different computers located at various sites through a network.

The database 20 includes a plurality of data elements 22, which may be arranged into functional groupings of two-dimensional relationships, three-dimensional relationships, four-dimensional relationships, etc. For illustration and example purposes, the database 20 is shown to have three sections, one for data-type A, one for data-type B, and the other for data-type C. The data-type generally corresponds to relational data. For example, data-type A may be for company X, while data-type B may be for company Y and data-type C may be for company Z. Each grouping of rows includes a plurality of columns, one for employee data, another for security information, and a third for payroll information. The employee data may include the employee name, employee phone number, social security number, address, department number, etc. The security information for an employee includes access to certain facilities, expenditure authority, signature authority, etc. The payroll information includes information as to whether the employee is exempt or non-exempt, the employee wages, bonus structures, taxing information, and other relevant payroll information.

As shown, the three groupings, data-type A, B, and C may each have a separate symmetric key for accessing data elements within those areas of the database. In addition, a symmetric key may be generated for the entire database, which would be used by a system administration or other such entity. In addition, data-type A information is broken down into column groupings, data-type A-A, data-type A-B, data-type A-C. Thus, each of these columns may have its own symmetric key, thereby controlling access to each section. The data-type C group is broken into row groupings, data-type C-A, data-type C-B, data-type C-C and data-type C-xx, where each row grouping may have its own symmetric key. The data-type B section of the database is not divided into sub-groupings, thus one symmetric key may access the entire section.

As mentioned, the column grouping of data-type A-A may have its own symmetric key that is secured based on a single encryption public key or a plurality of encryption public keys. If it secured based on a single encryption public key, only one user can access the data (i.e., the user having the corresponding decryption private key). If the symmetric key is secured based on a plurality of encryption public keys, then each user having a corresponding decryption private key can access this section of the database. For example, each employee within a company may receive an encryption public key and a decryption private key pair. The information in column A-A may be secured with a symmetric key that is secured based on the encryption public key of each employee of the company. As such, each employee, utilizing its decryption private key may decrypt the symmetric key and subsequently access data within column A-A. In this manner, the data in column A-A may be used as an employee directory for all employees to access. Further note that an employee may be given only read access to the data which may be controlled by the data control application 24.

The data contained in column A-B, which relates to security information, may be encrypted using the same or a different symmetric key that is further secured by a set of encryption public keys. The set of encryption public keys may be assigned to corporate security officers and/or department heads. As such, only a few people are allowed to access (e.g., read, write, edit, etc.) security data within the database.

The third column of information A-C, which relates to payroll information, may be secured with the same or different separate symmetric key that is further secured by a single encryption public key. The single encryption public key may be owned by the manager of the payroll department such that only the manager of the payroll department may access the secured payroll data.

The grouping within data-type C, allows for individual employees, based on their encryption public key, to access data related to them. As such, the employee relating to data-type C-A, may utilize its encryption public key to decrypt a secured symmetric key, to obtain the data relating to itself. As with any database, the employee may only be given read privileges related to any or all of the data elements relating to him or herself. Note that the same private/public key pair could be shared among a group and not just individuals.

By utilizing an encryption public key to secure a symmetric key, the present invention allows a database to be secured with controlled access. As is known, encryption public keys are assigned by a certification authority, which is operated by a trusted entity, (e.g., the company's security administrator). As such, the certification authority controls who has access to the database sense via the issuance of encryption public key pairs, wherein the database's symmetric key was secured via the encryption pubic key. Thus, without the corresponding decryption private key, the symmetric key cannot be recaptured, thereby denying access to the database. In addition, by utilizing the same, recurring symmetric key and encryption public key in combination, the amount of overhead needed to secure multiple items in the database is minimized.

Figure 2:
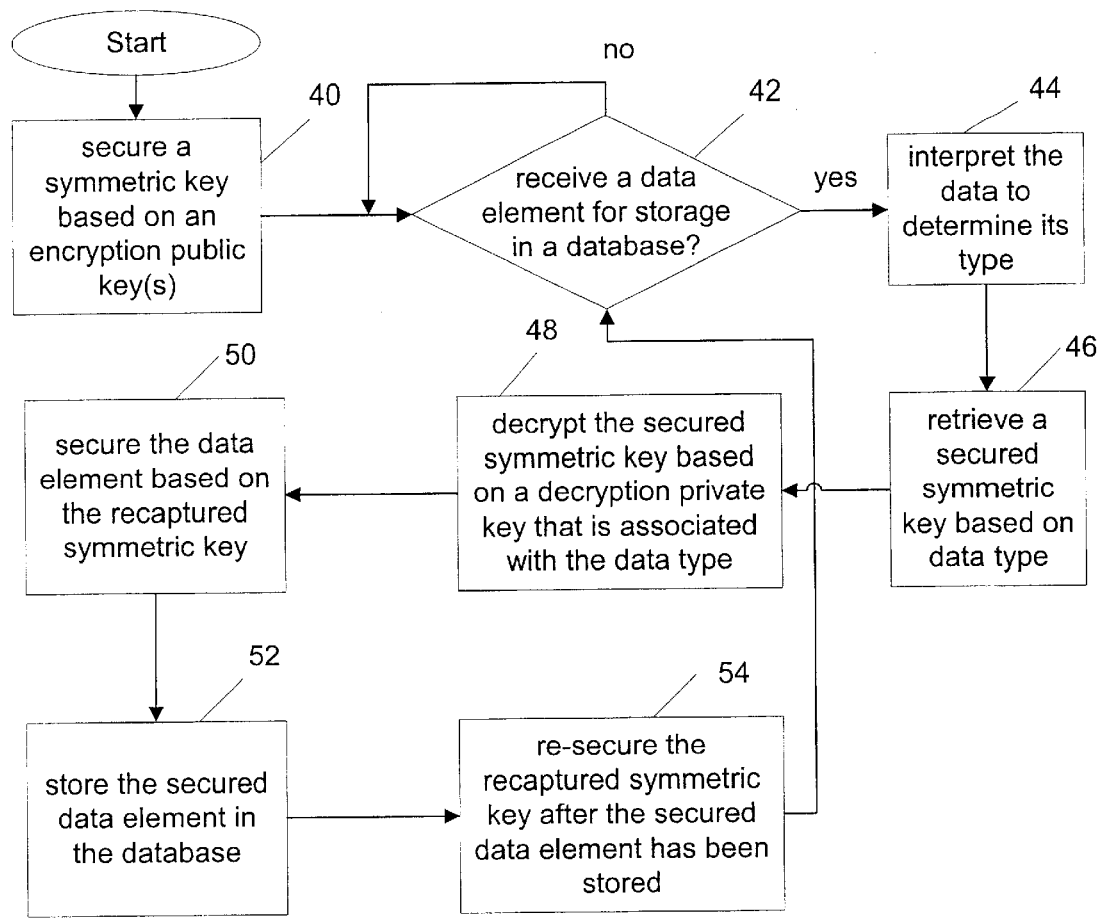
FIG. 2 illustrates a logic diagram of a method for securing data elements within a database in accordance with the present invention.

FIG. 2 illustrates a logic diagram of a method for securing data within a database. The process begins at step 40 where a symmetric key is secured based on an encryption public key or a plurality of encryption public keys. A single encryption public key would be used if the entire database were only accessible to the entity associated with the encryption public key. Alternatively, if other entities were to have access to the database, the encryption public keys for each of those entities would be used to secure the symmetric key i.e., produce a wrapped session key therefor. Note that an entity may be an individual user allowed accessing the computing device, a group and/or a software application.

Having secured the symmetric key, the process proceeds to step 42. At step 42, a determination is made as to whether a data element has been received for storage in the database. A data element may be a single bit of information, a byte of information or a plurality of bytes of information. For example, as mentioned with reference to FIG. 1, a plurality of data elements may store employee information. Thus, a data element may exist for the employee's name, another for his or her address, etc. If a data element is not received for storage, the process waits until one is received.

Once a data element is received for storage, the process proceeds to step 44 where the data is interpreted to determine its data-type. Having determined the data-type, the process proceeds to step 46 where a secured symmetric key is retrieved based on the data-type. Having retrieved the secured symmetric key, the process proceeds to step 48 where the secured symmetric key is decrypted based on a decryption private key that is associated with the data-type, and the entity requesting the data. As mentioned with reference to FIG. 1, data within a database may be grouped in data-type groupings. Such data-type groupings may be for relational data, such as employee information, payroll information, security information, etc. In addition, datatypes may be broken down between different companies, or divisions within a company. As such, a secured symmetric key may be secured by a single encryption public key such that only one entity is allowed to access the database, a group sharing the single encryption public key or from a plurality of encryption public keys such that each entity affiliated with the encryption public key may access the database. Additionally, a plurality of symmetric keys may be secured by a plurality of encryption public keys such that each entity associated with the encryption public key has its own symmetric key for securing data within a separate portion of the database. Examples of data formats that utilize public keys to secure symmetric keys, include Privacy Enhanced Mail (PEM) and Public Key Cryptographic Standard #7 (PKCS#7).

Once the secured symmetric key has been decrypted, the process proceeds to step 50 where the data element is secured based on the recaptured symmetric key using an encryption algorithm such as DES. The process then proceeds to step 52 where the secured data element is stored within the database. The process then proceeds to step 54 where the recaptured symmetric key is resecured after the secured data element has been stored. The recaptured symmetric key may be resecured by destroying it, or by re-encrypting it using the appropriate encryption public key or a plurality of public encryption keys. The plurality of encryption keys could include new public keys to allow new users access to the data. Note that, to minimize exposure of the recaptured symmetric key, the recaptured symmetric key should be resecured as soon as possible after the data element is secured. This may also be done before the data element is stored.

Figure 3:
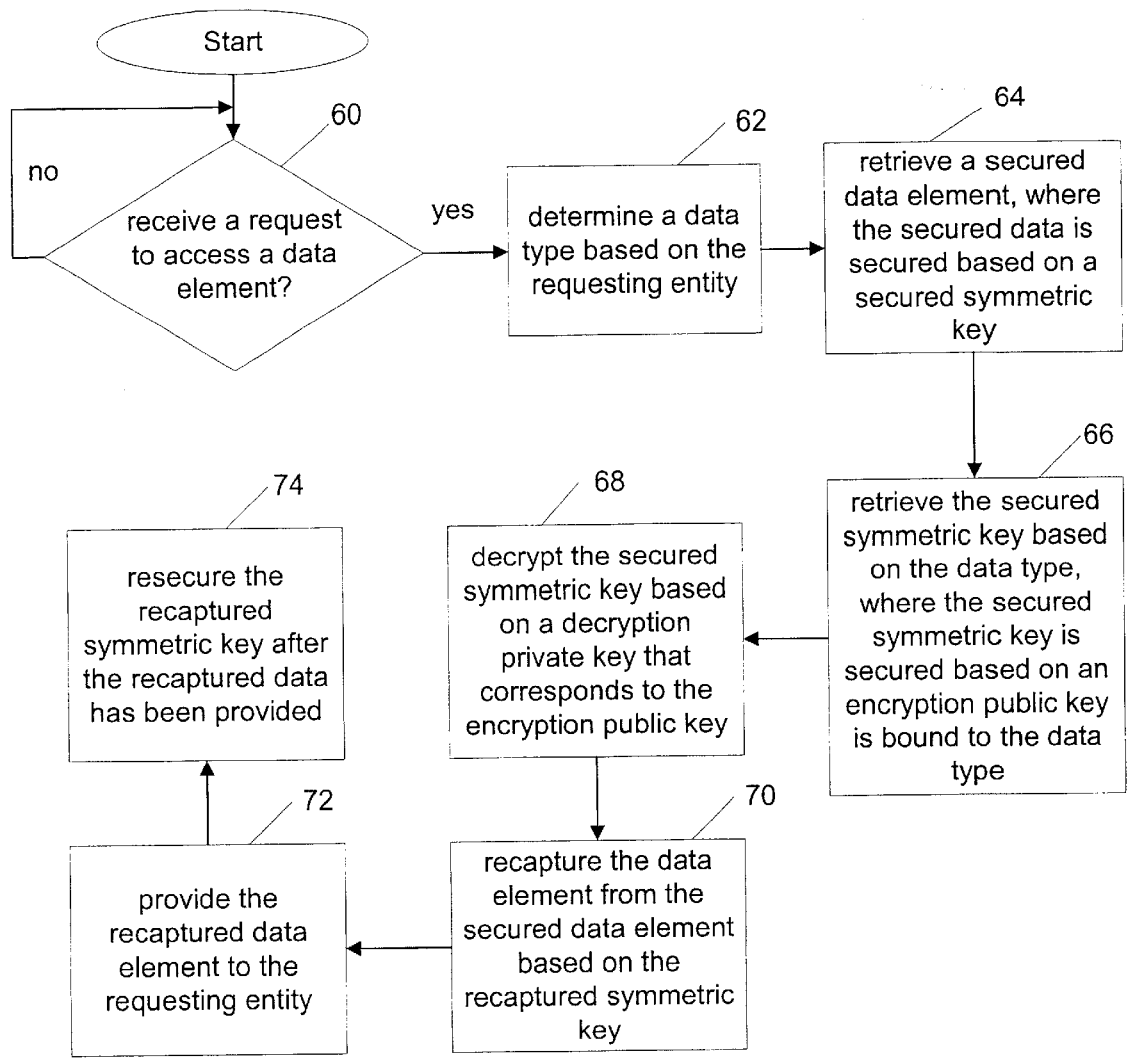
FIG. 3 illustrates a logic diagram of a method for accessing secured data elements within a database in accordance with the present invention.

FIG. 3 illustrates a logic diagram of a method for accessing secured data elements within the database. The process begins at step 60 where a determination is made as to whether a request to receive access to a data element has been received. Once a request has been received, the process proceeds to step 62 where the data-type of the requested data element is determined. Such a determination may be made on the identity of the requesting entity. For example, from the illustration of FIG. 1, if an employee of company Z (which information is stored in data-type C), is desiring to access information, the system would recognize the identity of the requesting entity and determine the particular datatype therefrom.

With the data-type identified, the process proceeds to step 64 where a secured data element is retrieved from the database. The secured data element was stored in the database based on a secured symmetric key. Such securing of the data element was described with reference to FIG. 2 and will be further described with reference to FIG. 4. The process then proceeds to step 66 where the secured symmetric key is retrieved based on the data-type. The secure symmetric key is secured based on an encryption public key, which is bound to the data-type. As mentioned with reference to FIG. 1, the data may be stored using a symmetric key that is secured by an individual encryption public key or a plurality of encryption public keys. In addition, portions of the database may be secured using one symmetric key while other portions may be secured using another symmetric key. Depending on how the data was secured, i.e., which secured symmetric key was utilized, the corresponding decryption private key of the encryption key that produced the secured symmetric key is retrieved to decrypt the secured symmetric key. This is illustrated at step 68.

Once the symmetric key has been recaptured, the secured data element is decrypted utilizing the recaptured symmetric key. The process then proceeds to step 72 where the recaptured data element is provided to the requesting entity. Having done this, the process proceeds to step 74 where the recaptured symmetric key is resecured after the data has been provided to the requesting entity.

Figure 4:
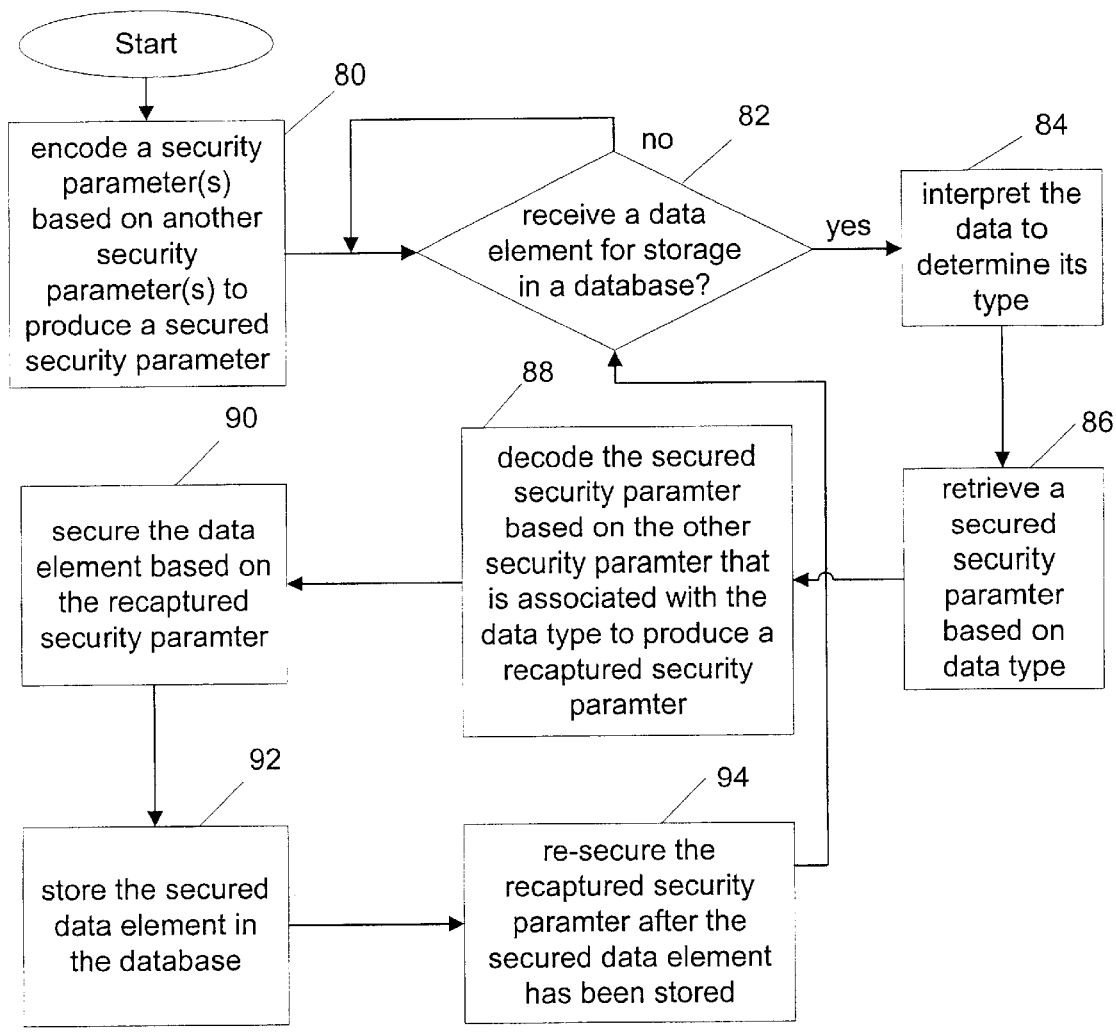
FIG. 4 illustrates a logic diagram of an alternate method for securing data elements in a database in accordance with the present invention.

FIG. 4 illustrates a logic diagram of an alternate method of securing data elements within a database. The process begins at step 80 where a security parameter is encoded based on another security parameter to produce a secured security parameter. Note that each security parameter may be of a symmetric, asymmetric, or other type (e.g. a hybrid) key and/or parameter. For example, the first type of security parameter may be a symmetric key and the other security parameter may be another symmetric key. As such, one symmetric key may be utilized to encrypt, or encode, the other symmetric key. Alternatively, the first security parameter may be a symmetric key while the second security parameter may be an encryption public key. If a single entity is to be authorized to access the database, a single security parameter is encoded using the other security parameter. If, however, a plurality of users is allowed to access data within a database, the first security parameter may be encoded by a plurality of second security parameters. If portions of the database were to be made available to individual entities, the security parameters for each portion would be encoded using a corresponding second security parameter of the entity allowed to access the particular portion. As an alternative, if groups of entities are to be given access to portions of the database, the first security parameter for each portion of the database would be secured, or encoded, based on a group of second security parameters.

The process proceeds then to step 82 where a determination is made as to whether a data element has been received for storage in the database. Once a data element has been received, the process proceeds to step 84 where the data is interpreted to determine its type. Having determined the data-type, the process proceeds to step 86, where a secured, security parameter is retrieved based on the data-type. The process then proceeds to step 88 where the secured security parameter is decoded based on the other security parameter that is associated with the data-type. Having recaptured the first security parameter the process proceeds to step 90, where the data element is secured based on the recaptured first security parameter. The process then proceeds to step 92 here the secured data element is stored in the database. The process then proceeds to step 94 where the recaptured security parameter is resecured. The resecuring is done after the secured data element has been stored. The process then continues at step 82 for storing another data element.

The programming instructions of FIGS. 2 through 4 may be stored on a memory device or a plurality of memory devices. A memory device may be a read-only memory, random access memory, floppy disk memory, hard disk memory, magnetic tape memory, CD memory, DVD memory, and/or any other device which stores digital information. Further, the programming instructions of FIG. 2 through 4 may be on a stand-alone memory device or in a memory device that is included in a computing device.

The preceding discussion has presented a method and apparatus for securing and accessing data elements within a database. Such a method allows for controlling the access to the database without compromising security, while not adding undue amounts of storage overhead. The control is established by encrypting symmetric keys using encryption public keys, which are granted by certification authorities. Such certification authorities, therefore, control which entities have access to the database. The overhead cost savings result from having specific recaptured symmetric keys associated to data items or logical groupings of data items within the database.

What is claimed is:

1. A method for securing data elements within a database that stores a plurality of data elements, the method, the method comprises the steps of:
   a) securing a symmetric key used to secure a data element in the database, based on an encryption public key to produce a secured symmetric key, the secured symmetric key and the encryption public key being stored in a memory;
   b) receiving a data element for storage in the database;
   c) retrieving the secured symmetric key;
   d) decrypting the secured symmetric key based on a decryption private key to produce a recaptured symmetric key, wherein the decryption private key corresponds to the encryption public key,
   e) securing the data element based on the recaptured symmetric key to produce a secured data element; and
   f) storing the secured data element in the database to produce a secured data element within the database.

2. The method of claim 1 further comprises re-securing the recaptured symmetric key after the secured data element has been stored.

3. The method of claim 1 further comprises:
   receiving a second data element;
   securing the second data element based on the recaptured symmetric key to produce a second secured data element; and
   storing the second secured data element in the database.

4. The method of claim 1 further comprises:
   interpreting the data element to determine a data-type; and
   when the data element is of a first data-type, retrieving the secured symmetric key, wherein the secured symmetric key is bound to the first data-type.

5. The method of claim 4 further comprises:
   when the data element is of a second data-type, retrieving a second secured symmetric key, wherein the second secured symmetric key is bound to the second data-type, and wherein the second secured symmetric key is secured based on the encryption public key;
   decrypting the second secured symmetric key based on the decryption private key to produce a second recaptured symmetric key; and
   securing the data element based on the second recaptured symmetric key to produce the secured data element.

6. The method of claim 4 further comprises:
   when the data element is of a second data-type, retrieving a second secured symmetric key, wherein the second secured symmetric key is bound to the second data-type, and wherein the second secured symmetric key is secured based on a second public key;
   decrypting the second secured symmetric key based on a second decryption private key to produce a second recaptured symmetric key, wherein the second decryption private key corresponds to the second encryption public key; and
   securing the data element based on the second recaptured symmetric key to produce the secured data element.

7. The method of claim 1 further comprises:
   within step (a), securing the symmetric key based on a plurality of encryption public keys to produce a plurality of secured symmetric keys; and
   within step (d), decrypting one of the secured symmetric keys based on a decryption private key associated with the one of the plurality of encryption public keys to produce the recaptured symmetric key.

8. A method for accessing at least one data element that is stored in a database, the method comprises the steps of:
   a) receiving a request for access to at least one of a plurality of data elements from a requesting entity;
   b) retrieving a secured data element within the database in response to the request;
   c) determining a secured symmetric key from a plurality of secured symmetric keys that is associated with the secured data element, the plurality of secured symmetric keys being stored in a memory,
   d) retrieving the secured symmetric key;
   e) decrypting the secured symmetric key based on a decryption private key to produce a recaptured symmetric key, wherein the secured symmetric key is secured based on an encryption public key that corresponds to the decryption private key;
   f) recapturing the data element from the secured data element based on the recaptured symmetric key to produce a recaptured data element; and
   g) providing the recaptured data element to the requesting entity.

9. The method of claim 8 further comprises re-securing the recaptured symmetric key after the recaptured data element has been provided.

10. The method of claim 8 further comprises:
    retrieving a second secured data element in response to a second request;
    recapturing the second data from the second secured data element based on the recaptured symmetric key to produce a second recaptured data element; and
    providing the second recaptured data element to the requesting entity.

11. The method of claim 8 further comprises:
    determining a data-type based on the requesting entity; and
    when the data element is of a first data-type, retrieving the secured symmetric key, wherein the secured symmetric key is bound to the first data-type.

12. The method of claim 11 further comprises:
    when the data element is of a second data-type, retrieving a second secured symmetric key, wherein the second secured symmetric key is bound to the second data-type, and wherein the second secured symmetric key is secured based on the public key;

decrypting the second secured symmetric key based on the decryption private key to produce a second recaptured symmetric key; and recapturing the data element from the secured data element based on the second recaptured symmetric key to produce the recaptured data element.

13. The method of claim 11 further comprises:

when the data element is of a second data-type, retrieving a second secured symmetric key, wherein the second secured symmetric key is bound to the second data-type, and wherein the second secured symmetric key is secured based on a second public key;

decrypting the second secured symmetric key based on a second decryption private key to produce a second recaptured symmetric key, wherein the second decryption private key corresponds to the second encryption public key; and recapturing the data element from the secured data element based on the second recaptured symmetric key to produce the recaptured data element.

14. A method for security at least one of a plurality of data elements in a database, the method comprises the steps of:

a) encoding a first security parameter based on a second security parameter to produce a secured first security parameter, wherein the first security parameter is associated wit a first securing process, and wherein the second security parameter is associated with a second securing process, the first and second security parameters being stored in a memory;

b) receiving a data element for storage in the database;

c) retrieving the secured first security parameter;

d) decoding the secured first security parameter based on the second security parameter to recapture the first security parameter;

e) securing the data element based on the first security parameter to produce a secured data element; and f) storing the secured data element in the database to produce a secured data element within the database.

15. The method of claim 14 further comprises, within step (a), encoding a first symmetric key based on a second symmetric key.

16. The method of claim 14 further comprises:

within step (a), encoding a symmetric key based on an encryption public key to produce a secured symmetric key; and within step (d), decoding the secured symmetric key based on a decryption private key, wherein the decryption private key corresponds to the encryption public key.

17. The method of claim 14 further comprises:

interpreting the data element to determine a data-type; and when the data element is of a first data-type, retrieving the secured first security parameter, wherein the secured first security parameter is bound to the first data-type.

18. The method of claim 14 further comprises:

when the data element is of a second data-type, retrieving a secured third security parameter, wherein the secured third security parameter is bound to the second data-type, and wherein the secured third security parameter is secured based on the second security parameter;

decoding the secured third security parameter based on the second security parameter to produce a recaptured third security parameter; and securing the data element based on the recaptured third security parameter to produce the secured data element.

19. The method of claim 18 further comprises:

when the data element is of a second data-type, retrieving a secured third security parameter, wherein the secured third security parameter is bound to the second data-type, and wherein the secured third security parameter is secured based on a fourth security parameter;

decoding the secured third security parameter based on the fourth security parameter to produce a recaptured third security parameter; and securing the data element based on the recaptured third security parameter to produce the secured data element.

* * * * *